G. B. WILLIAMS.
TEMPLET DEVICE.
APPLICATION FILED APR. 10, 1911.
1,065,994.
Patented July 1, 1913.
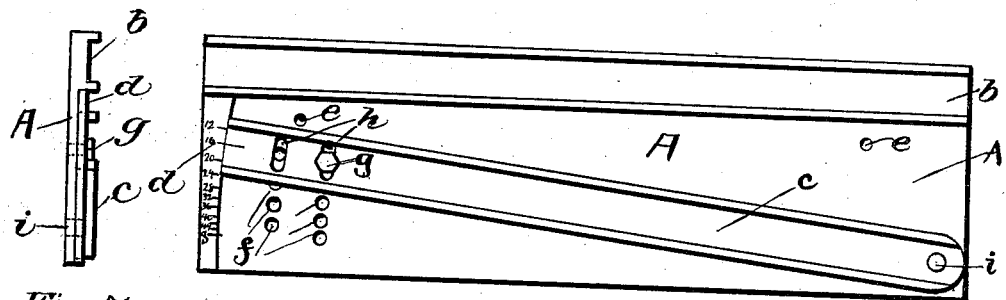
Fig 5    Fig. 1
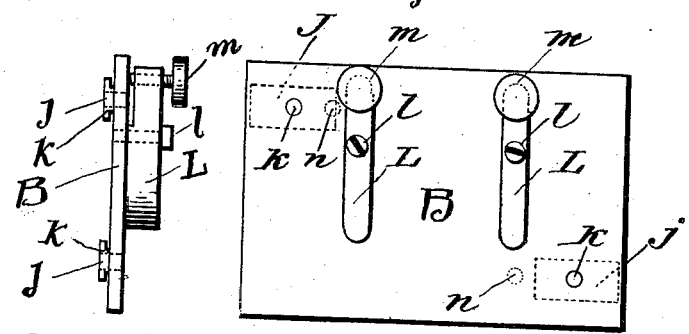
Fig 6    Fig 2
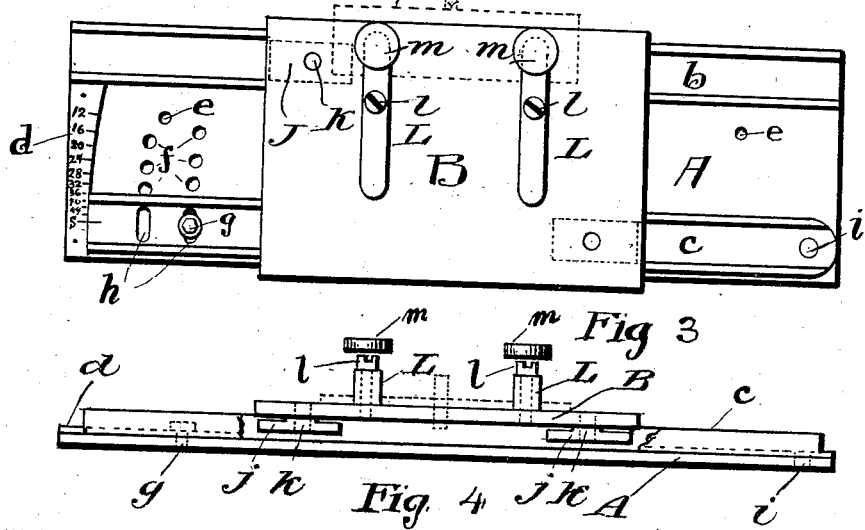
Witnesses
Charles L. Johnson
Arlita Adams
Inventor
Grant Burton Williams

UNITED STATES PATENT OFFICE.

GRANT BURTON WILLIAMS, OF SEATTLE, WASHINGTON.

TEMPLET DEVICE.

1,065,994.  Specification of Letters Patent.  Patented July 1, 1913.

Application filed April 10, 1911. Serial No. 620,261.

*To all whom it may concern:*

Be it known that I, GRANT BURTON WILLIAMS, a citizen of the United States, residing at Seattle, in the county of King and State of Washington, have invented a new and useful templet device to be used in conjunction with a grinding-wheel, file, scraper, or other cutting or marking instrument for grinding, cutting, or otherwise forming or marking to form curves or straights as applied to straight-edges and curved templets used by sawsmiths, machinists, and other mechanics, of which the following is a specification.

My invention relates to a templet making device in which a movable carriage operates on a bed plate and straight guides in conjunction with a grinding wheel or other suitable cutting implement.

The objects of my invention are, first, to provide a means to produce segmental curves by the use of a movable carriage operated on and guided by two straight guides set nonparallel to each other; second, to provide a method by which a slightly curved templet to any desired radius may be produced without intricate mathematical calculation by the operator; third, to provide a means for describing curves of large radius; fourth, to provide a means by which straight-edges and curved templets may be made accurately by a person not highly skilled; fifth, to provide a device having suitable clamping arrangement to properly hold the work in place, convenient adjustments to produce straight-edges or curves of different radius as desired and which device may be appliable to operate in conjunction with a grinding wheel, file, grind-stone or other suitable cutting implement commonly at hand. I attain these objects by the mechanism illustrated in the accompanying drawing, in which—

Figure 1 is a bed plate which serves to support the guides and hold them in the desired position: shown with carriage removed and guides set nonparallel to each other. Fig. 2 is a top view of the carriage which serves to carry the piece in process of grinding. Fig. 3 is a top view of the device when assembled and the guides set parallel to each other; the dotted lines show the relative position of a straight-edge and grinding wheel when in use. Fig. 4 is a side view of the device with portion of the guides removed to show the slides. Fig. 5 is an end view of Fig. 1. Fig. 6 is an end view of Fig. 2.

Similar letters refer to similar parts throughout the drawings.

A is a bedplate supporting fixed guide $b$, movable guide $c$ and graduated plate $d$, and may be attached to a bench or other support through holes $e\ e$; holes $f$ are threaded for holding movable end of guide $c$ in the desired position by screw $g$ through oblong holes $h$; pin $i$ being fixed to hold opposite end of guide $c$ and allowing same to swing at graduated plate end.

B is a carriage with pivoted slides $j\ j$ swinging on pins $k\ k$ and run in grooved guides $b$ and $c$.

L L are clamping pieces held in place by screws $l\ l$ and having clamping screws $m\ m$ for the purpose of holding the piece of which templet or straight-edge is being made in place on the carriage.

Dotted lines indicate position of an article being shaped and the grinding wheel which does the cutting; the guides being set parallel to each other this would produce a straight edge upon being moved the length of piece a number of times with edge in contact with grinding wheel. The piece being held in place by pressure of screws $m\ m$ can readily be moved to and from grinding wheel by use of a hammer or other implement striking edges of same.

To grind the edge of a piece of plate or sheet metal or other substance to a curve, the piece may be clamped to the carriage approximately as shown by dotted lines $x$ by turning downward the clamp screws $m\ m$, the machine adjusted in front of grinder and fastened in place by two screws through holes $e\ e$, the movable end of guide $c$ being set to graduation mark indicating the desired curve, as carriage would be moved forward and back in the guides, the guides being farther apart at one end than at the other would swing carriage B in a direction transverse to its longitudinal axis and a fixed point at $z$ would describe a curved line along the edge of carriage B.

Carriage B may be reciprocated by hand or by a crank and rod or other mechanical contrivance.

I am aware that prior to my invention curves and circles have been produced by the use of straight guides set nonparallel to each other and do not claim that such a combination as my invention; and I do not claim that my device will produce a curve whose radius is less than the length of its guides.

Having described my invention what I claim as new and desire to secure by Letters Patent is—

The combination in a templet device, of two guides attached to a bed plate or other suitable support, one of said guides being fixed to said support and the other guide being pivoted at or toward one of its ends and the other end of said guide arranged to swing along a graduated arc and provided with suitable means for holding same in place at any desired point along said arc, a movable carriage having pivoted slides at or toward its diagonal opposite corners, said slides each moving in a different guide for the purpose of guiding either end of said carriage in a different direction than the other end; thus describing a true segment of a circle; all substantially as set forth.

GRANT BURTON WILLIAMS.

Witnesses:
 CHARLES L. JOHNSON,
 ARLITA ADAMS.

Copies of this patent may be obtained for five cents each, by addressing the "Commissioner of Patents, Washington, D. C."